United States Patent [19]
Takamura

[11] Patent Number: 4,765,723
[45] Date of Patent: Aug. 23, 1988

[54] OBJECTIVE LENS SYSTEM FOR OPTICAL READING DEVICE

[75] Inventor: Sachiko Takamura, Kyoto, Japan

[73] Assignee: Minolta Camera Kabushiki Kaisha, Osaka, Japan

[21] Appl. No.: 926,644

[22] Filed: Nov. 3, 1986

[30] Foreign Application Priority Data

Nov. 5, 1985 [JP] Japan .............................. 60-247545
Apr. 24, 1986 [JP] Japan .............................. 61-095400

[51] Int. Cl.$^4$ .......................... G02B 13/18; G02B 3/00
[52] U.S. Cl. ...................................... 350/432; 350/409
[58] Field of Search ................................. 350/432, 409

[56] References Cited

U.S. PATENT DOCUMENTS

| | | | |
|---|---|---|---|
| 4,449,792 | 5/1984 | Arai et al. ............................ | 350/432 |
| 4,571,034 | 2/1986 | Nakamura ........................... | 350/432 |
| 4,655,556 | 4/1987 | Kajitani .............................. | 350/432 |

FOREIGN PATENT DOCUMENTS

58-17409 2/1983 Japan .
59-12412 1/1984 Japan .
60-120310 6/1985 Japan .

*Primary Examiner*—John K. Corbin
*Assistant Examiner*—Ronald M. Kachmarik
*Attorney, Agent, or Firm*—Price, Gess & Ubell

[57] ABSTRACT

An objective lens system for use in a device for optically reading digital data on an optical disk is constituted by a single objective lens without use of a collimator lens element. A light source side aspherical surface of the objective lens element has a positive refractive power and a disk side surface thereof has a positive refractive power, too. The objective lens system is used with the projecting magnification $\beta$ which falls within the range $-\frac{1}{2}<\beta<-\frac{1}{8}$.

The objective lens system fulfills the following condition:

$$0.9 \leq (N_1-1)r_1/f \leq 3.9$$

$$1.4 \leq d_1 r_1/f^2 \leq 4.0$$

$$1.4 \leq d_1^2/f^2(N_1-1) \leq 4.0$$

wherein,
f represents the focal length of the single lens element;
$r_1$ represents the paraxial radius of curvature of the light source side surface of the single lens component;
$N_1$ represents the refractive index of the single lens element; and
$d_1$ represents the axial thickness of the single lens element.

10 Claims, 9 Drawing Sheets

-0.001  0.001
Spherical Aberration

-0.001  0.001
Astigmatism

-0.001  0.001
Sine Condition

-0.001  0.001
Spherical Aberration

-0.001  0.001
Astigmatism

-0.001  0.001
Sine Condition

-0.001  0.001
Spherical Aberration

-0.001  0.001
Astigmatism

-0.001  0.001
Sine Condition

FIG.11A
NA 0.47
SA
-0.001  0.001
Spherical Aberration

FIG.11B
y' 0.033
----- DM
——— DS
-0.001  0.001
Astigmatism

FIG.11C
NA 0.47
-0.001  0.001
Sine Condition

FIG.12A
NA 0.47
SA
-0.001  0.001
Spherical Aberration

FIG.12B
y' 0.033
----- DM
——— DS
-0.001  0.001
Astigmatism

FIG.12C
NA 0.47
-0.001  0.001
Sine Condition

FIG.13A
NA 0.47
SA
-0.001  0.001
Spherical Aberration

FIG.13B
y' 0.033
----- DM
——— DS
-0.001  0.001
Astigmatism

FIG.13C
NA 0.47
-0.001  0.001
Sine Condition

FIG.14A
NA 0.47
SA
-0.001   0.001
Spherical Aberration

FIG.14B
y' 0.033
----- DM
——— DS
-0.001   0.001
Astigmatism

FIG.14C
NA 0.47
-0.001   0.001
Sine Condition

FIG.15A
NA 0.47
SA
-0.001   0.001
Spherical Aberration

FIG.15B
y' 0.033
----- DM
——— DS
-0.001   0.001
Astigmatism

FIG.15C
NA 0.47
-0.001   0.001
Sine Condition

FIG.16A
NA 0.47
SA
-0.001   0.001
Spherical Aberration

FIG.16B
y' 0.0625
----- DM
——— DS
-0.001   0.001
Astigmatism

FIG.16C
NA 0.47
-0.001   0.001
Sine Condition

FIG.20A
NA 0.45
Spherical Aberration
—SA

FIG.20B
y' 0.036
Astigmatism
-----DM
———DS

FIG.20C
NA 0.45
Sine Condition

FIG.21A
NA 0.45
Spherical Aberration
—SA

FIG.21B
y' 0.035
Astigmatism
-----DM
———DS

FIG.21C
NA 0.45
Sine Condition

FIG.22A
NA 0.63
Spherical Aberration
—SA

FIG.22B
y' 0.035
Astigmatism
-----DM
———DS

FIG.22C
NA 0.625
Sine Condition

FIG.23A
NA 0.75

—SA
-0.001  0.001
Spherical Aberration

FIG.23B
y' 0.035

----- DM
——— DS
-0.001  0.001
Astigmatism

FIG.23C
NA 0.746

-0.001  0.001
Sine Condition

FIG.24A
NA 0.47

—SA
-0.001  0.001
Spherical Aberration

FIG.24B
y' 0.035

----- DM
——— DS
-0.001  0.001
Astigmatism

FIG.24C
NA 0.47

-0.001  0.001
Sine Condition

FIG.25A
NA 0.47

—SA
-0.001  0.001
Spherical Aberration

FIG.25B
y' 0.035

----- DM
——— DS
-0.001  0.001
Astigmatism

FIG.25C
NA 0.47

-0.001  0.001
Sine Condition

OBJECTIVE LENS SYSTEM FOR OPTICAL READING DEVICE

BACKGROUND OF THE INVENTION

1. Field of the Invention

The present invention relates to an objective lens system for a device for optically reading digitalized information on an optical disk such as DAD.

2. Description of the Prior Art

Figure 6:
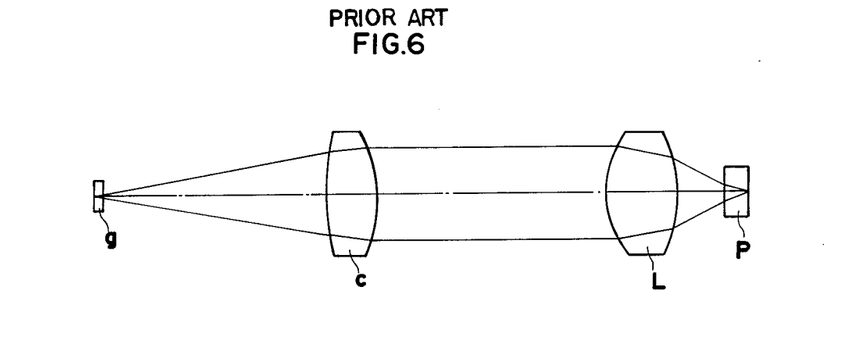
FIG. 6 is a cross sectional view of a conventional objective lens system.
Figure 7:
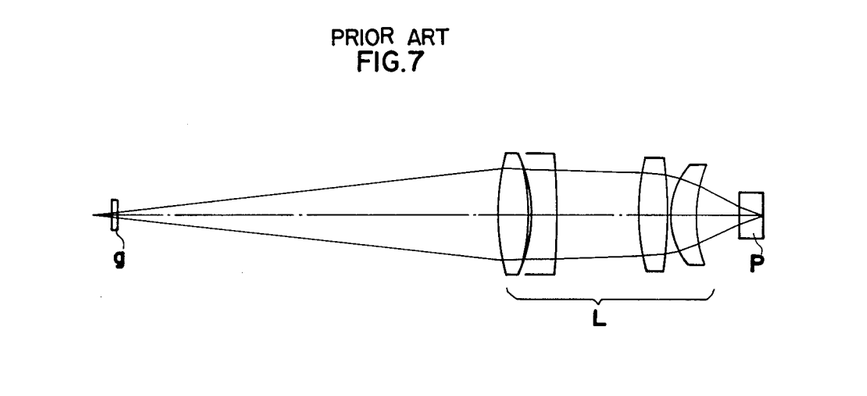
FIG. 7 is a cross sectional of another conventional objective lens system.
Figure 8A:
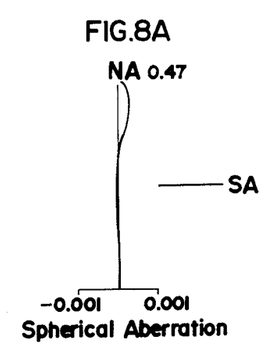
FIGS. 8A to 8C represent the aberration curves of the embodiment 1.
Figure 8B:
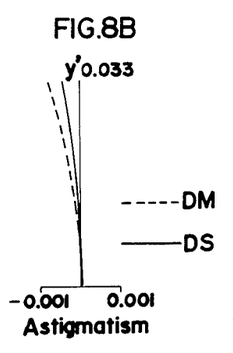
Figure 8C:
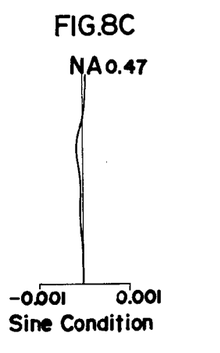
Figure 9A:
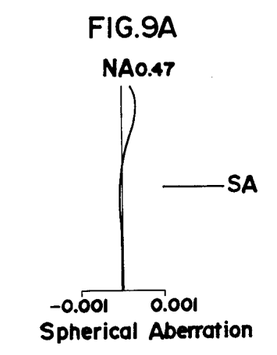
FIGS. 9A to 9C represent the aberration curves of the embodiment 2.
Figure 9B:
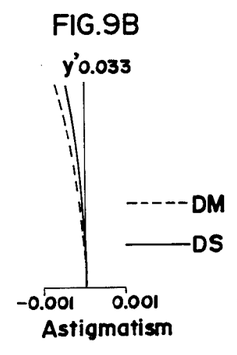
Figure 9C:
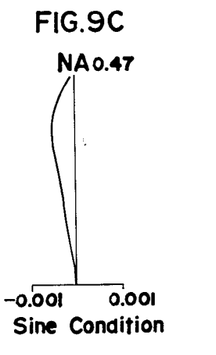
Figure 10A:
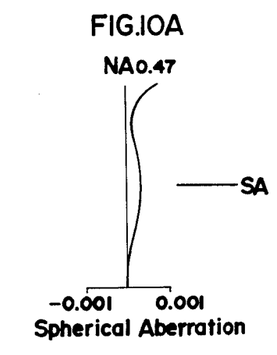
FIGS. 10A to 10C represent the aberration curves of the embodiment 3.
Figure 10B:
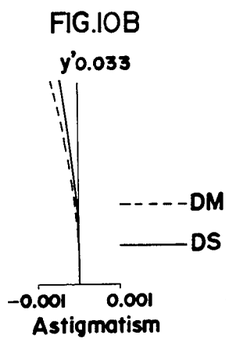
Figure 10C:
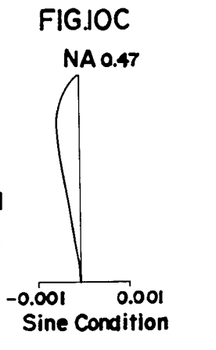
Figure 11A:
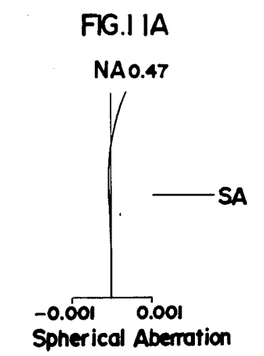
FIGS. 11A to 11C represent the aberration curves of the embodiment 4.
Figure 11B:
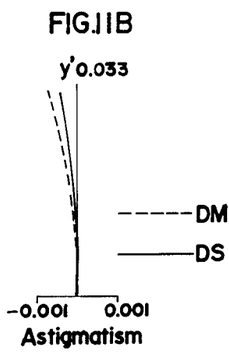
Figure 11C:
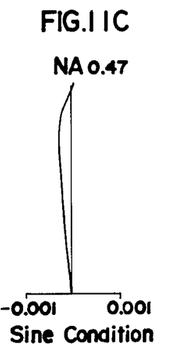
Figure 12A:
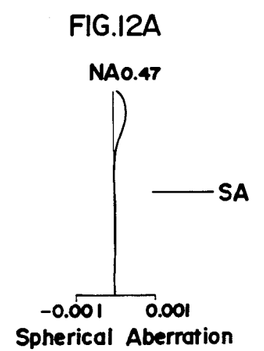
FIGS. 12A to 12C represent the aberration curves of the embodiment 5.
Figure 12B:
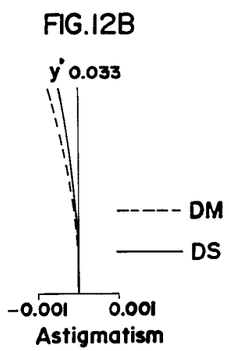
Figure 12C:
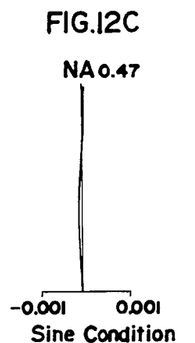
Figure 13A:
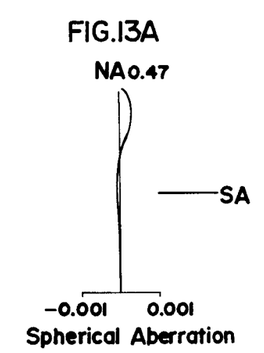
FIGS. 13A to 13C represent the aberration curves of the embodiment 6.
Figure 13B:
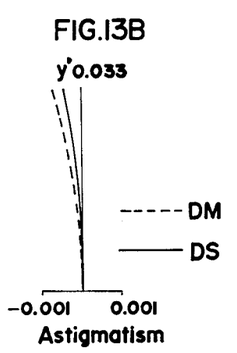
Figure 13C:
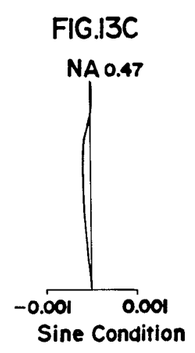
Figure 14A:
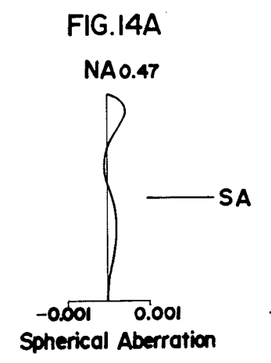
FIGS. 14A to 14C represent the aberration curves of the embodiment 7.
Figure 14B:
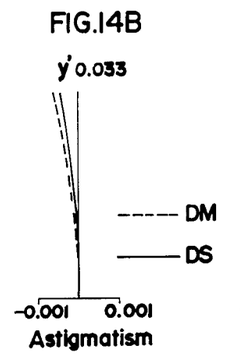
Figure 14C:
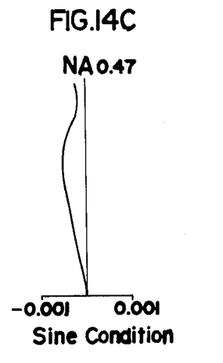
Figure 15A:
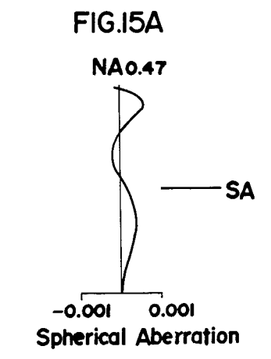
FIGS. 15A to 15C represent the aberration curves of the embodiment 8.
Figure 15B:
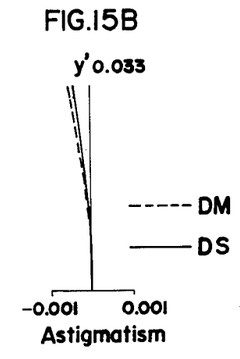
Figure 15C:
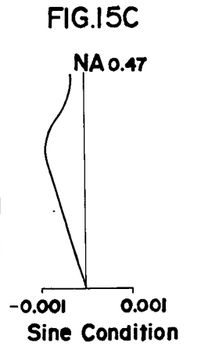
Figures 16A, 16B:
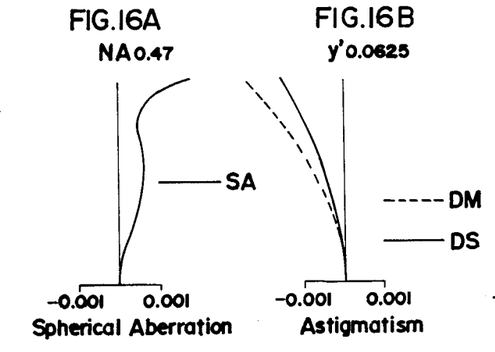
FIGS. 16A to 16C represent the aberration curves of the embodiment 9.
Figure 16C:
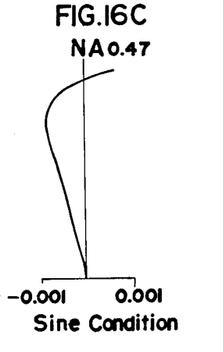
Figures 17A, 17B, 17C:
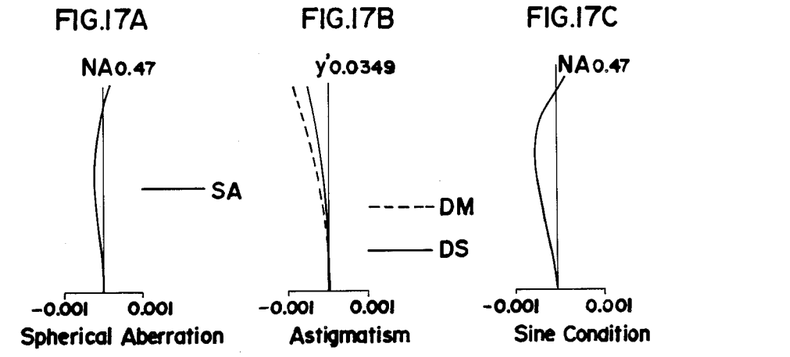
FIGS. 17A to 17C represent the aberration curves of the embodiment 10.
Figures 18A, 18B, 18C:
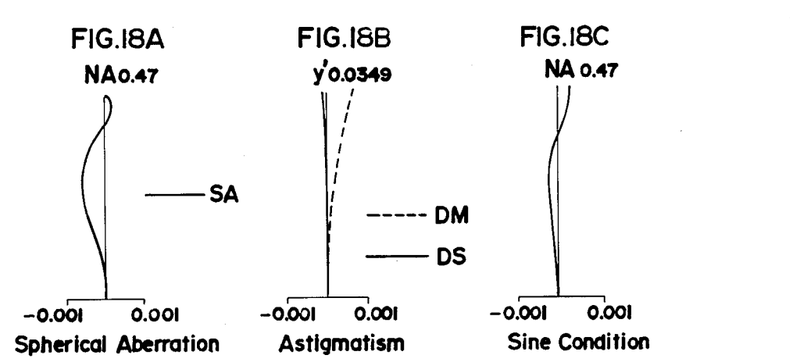
FIGS. 18A to 18C represent the aberration curves of the embodiment 11.
Figures 19A, 19B, 19C:
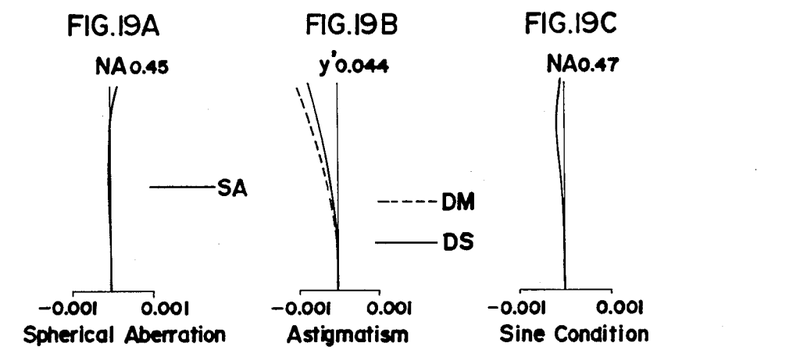
FIGS. 19A to 19C represent the aberration curves of the embodiemnt 12.
Figure 20A:
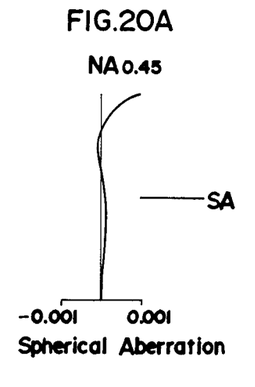
FIGS. 20A to 20C represent the aberration curves of the embodiment 13.
Figures 20B, 20C:
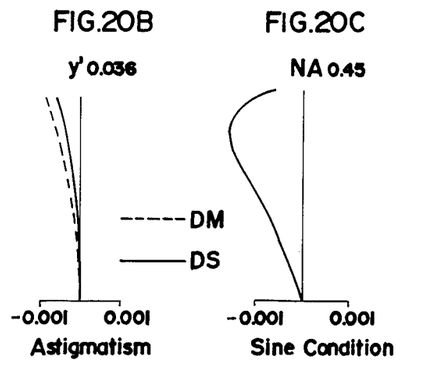
Figure 21A:
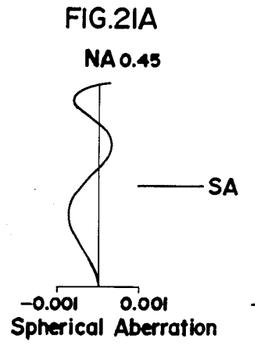
FIGS. 21A to 21C represent the aberration curves of the embodiment 14.
Figures 21B, 21C:
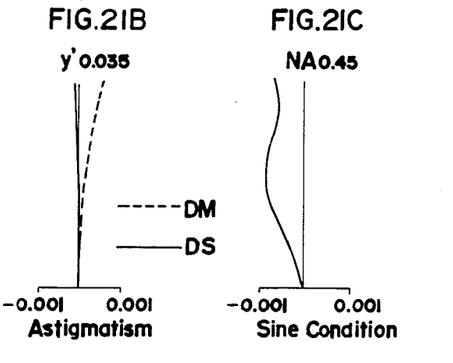
Figure 22A:
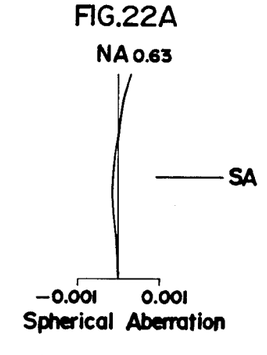
FIGS. 22A to 22C represent the aberration curves of the embodiment 15.
Figures 22B, 22C:
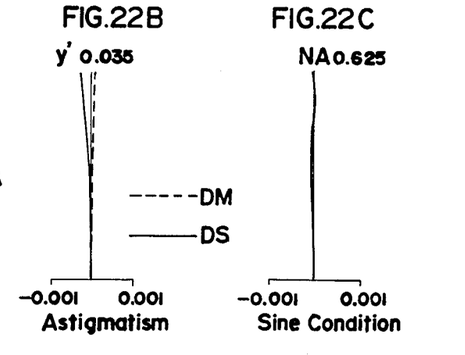
Figure 23A:
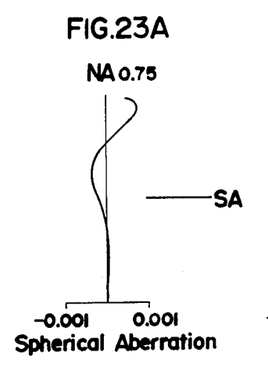
FIGS. 23A to 23C represent the aberration curves of the embodiment 16.
Figure 23B:
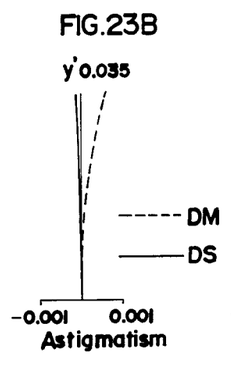
Figure 23C:
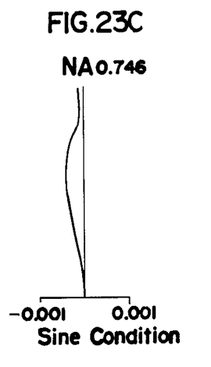
Figure 24A:
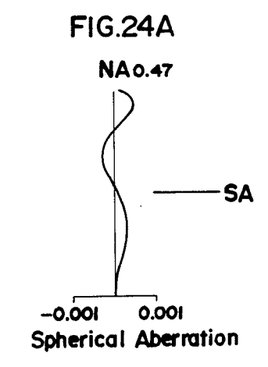
FIGS. 24A to 24C represent the aberration curves of the embodiment 17.
Figure 24B:
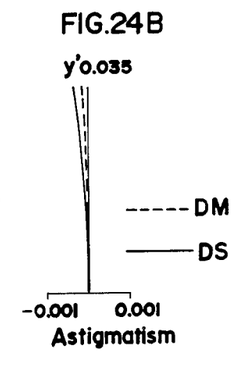
Figure 24C:
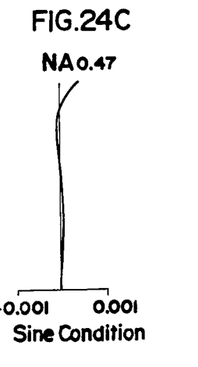
Figure 25A:
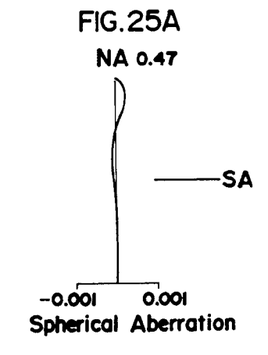
FIGS. 25A to 25C represents the aberration curves of the embodiment 18.
Figure 25B:
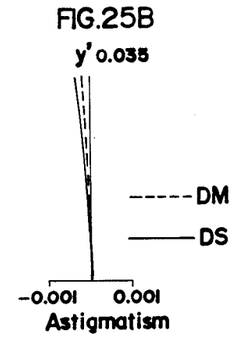
Figure 25C:
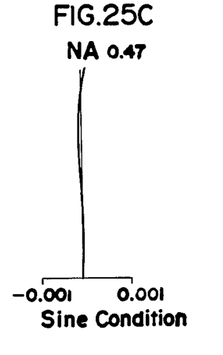

Conventional objective lens systems for use in a device for optically reading digitalized information need a collimator lens element (c) as shown in FIG. 6 when an objective lens is constituted by a single lens element or need an objective lens constituted by a plurality of lens elements as shown in FIG. 7 when no collimator lens element (c) is provided. In case of the former type, the collimator lens element (c) is always fixed while the objective lens element (L) is shifted, so that two lens-barrels are needed, resulting in difficulty of adjustment of the optical axis of the whole optical system.

As the objective lens systems of this type usually has an aspherical surface on the single objective lens element, optical performance is seriously deteriorated due to misalignment of the objective lens with the whole optical system and thus the adjustment of the optical axis of the single lens element to the whole optical system should be carried out very precisely. Also in case of the latter type, in which the objective lens element comprises a plurality of lens elements, it is necessary to arrange the lens barrel very precisely to maintain sufficient optical performance although an objective lens systems of this type need a larger space for the arrangement of the lens barrel as compared with those of the former type and distortion of the lens barrel due to the change of temperature causes misalignment of the lens elements, so that the optical performance tends to be deteriorated.

SUMMARY OF THE INVENTION

An object of the present invention is to provide an improved objective lens system for an optical reading device.

Another object of the present invention is to provide an objective lens system which does not have a collimator lens element but has an objective lens constituted by a single lens element adapted to receive directly light rays from a semiconductor laser and to converge the light rays on an optical disk.

Still another object of the present invention is to provide an objective lens system of the above mentioned type, in which the diameter of the single objective lens element can be finished with less precision so long as the centers of both sides of the lens element coincide with one another, and in which lens barrels can be manufactured with less precision, whereas the optical performance of the single objective lens element can be maintained when the lens barrel supporting the single objective lens element is provided with an adjusting mechanism which adjusts the inclination and deviation of the lens element relative to the optical axis of the whole optical system.

Further object of the present invention is to provide an objective lens system which can be used with definite magnification.

Still further object of the present invention is to provide an objective lens system of the above mentioned type, wherein aberrations are well corrected.

To achieve these objects, an objective lens system according to the present invention has an objective lens constituted by a single lens element; having a light source side aspherical surface with a positive refractive power and a disk side surface with a positive refractive power. The objective lens system is used with the projecting magnification $\beta$ which falls within the range, $-\frac{1}{2} < \beta < -\frac{1}{8}$, wherein the objective lens system fulfills the following conditions:

$$0.9 \leq (N_1 - 1)r_1/f \leq 3.9$$

$$1.4 \leq d_1 r_1/f^2 \leq 4.0$$

$$1.4 \leq d_1^2/f^2(N_1 - 1) \leq 4.0$$

wherein f represents the focal length of the single lens element, $r_1$ represents the paraxial radius of curvature of the light source side surface of the single lens element, $N_1$ represents the refractive power of the single lens element and $d_1$ represents the axial thickness of the single lens element.

The objects and features of the present invention which are believed to be novel are set forth with particularly in the appended claims. The present invention, both as to its orgainzation and manner of operation, together with further objects and advantages thereof, may best be understood by reference to the following description, taken in connection with the accompanying drawings.

DETAILED DESCRIPTION OF THE PREFERRED EMBODIMENTS

The following description is provided to enable any person skilled in the optical field to make and use the invention and sets forth the best modes contemplated by the inventor for carrying out my invention. Various modifications, however, will remain readily apparent to those skilled in the art, since the generic principles of the present invention have been defined herein specifically to provide a relatively economical and easily manufactured objective lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system.

In the drawings, schematic cross sectional views disclose the position of the lens element. Values of the radii of curvature and axial distances for each lens element and air space are provided in the accompanying tables set forth herein. The schematic cross sectional views of the respective embodiments follow the normal conventions of the light source at the left-hand side of the drawing and the disk at the right hand side.

Figure 1:
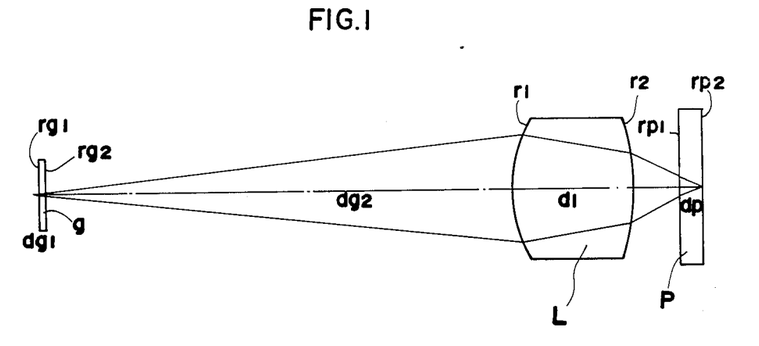
FIG. 1 is a cross sectional view of the objective lens system according to embodiments 1, 3, 4, 5, 7, 8, 9, 10, 11, 12 of the present invention.
Figure 2:
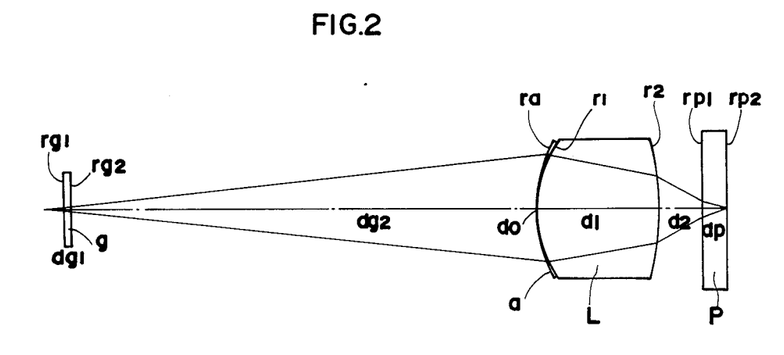
FIG. 2 is a cross sectional view of the objective lens system according to embodiments 2, 6, 13 of the present invention.

As shown in FIGS. 1 and 2, the present invention provides an objective lens system for a device for optically reading digital data on an optical disk with a single lens element (L) whose light source side aspherical surface ($r_1$) has a positive refractive power, and whose disk side surface ($r_2$) has a positive refractive index, and the objective lens system is used with the projecting magnification $\beta$ which falls within the range, $$-\tfrac{1}{2} < \beta < -\tfrac{1}{8}. \tag{2}$$

With no collimator lens arranged in front of the single objective lens element (L), incident light rays come into the single lens element (L) from an oblique direction inclined to the optical axis, so that the objective lens system according to this invention is used with a definite projecting magnification. The range of the magnification is limited in condition (1). If the magnification $\beta$ becomes greater beyond the upper limit of condition (1), the distance between the light source and the disk cannot be shortened to the extent leading to satisfactory compactization of the objective lens system.

On the other hand, if the magnification $\beta$ becomes smaller beyond the lower limit of condition (1), a space for arrangement of a beam splitter and so on cannot be assured and the image height required for correcting aberrations well cannot be provided in case that the objective lens element (L) is arranged inclined.

Assume here that a conventional objective lens element whose aberrations are corrected well at the magnification $\beta = 0$ is used with the magnification $\beta$ remaining in the range $-\tfrac{1}{2} < \beta < -\tfrac{1}{8}$ as an objective lens of an objective lens system not necessitating a collimator lens. In this case, the numerical aperture decreases, so that sufficient resolving power of 1 $\mu$m, cannot be achieved. This can be understood from the following equation $$NA\beta = NA\infty /(1-\beta)$$

in which $NA\infty$ is the numerical aperture of the disk side surface at the magnification $\beta = 0$ and $NA\beta$ is the numerical aperture of the disk side surface of the objective lens element at the magnification $\beta < 0$. If the objective lens element with $NA\infty = 0.45$ is used and at the magnification $\beta = -\tfrac{1}{4}$, the $NA\beta$ becomes 0.36. The resolving power becomes poorer as the numerical aperture $NA\beta$ assumes a smaller value. Therefore at the magnification $\beta = -\tfrac{1}{4}$ with $NA\beta = 0.36$ resolving power of 1 $\mu$m, cannot be achieved. If the aperture of the objective lens element (L) is increased in order to make $NA\beta$ great, spherical aberration in the on-axial region, and the coma aberration in the off-axial region, are caused considerably. To correct these aberrations the objective lens system according to the present invention fullfills the following conditions:

$$0.9 \leq (N_1-1)r_1/f \leq 3.9 \tag{2}$$

$$1.4 \leq d_1 r_1/f^2 \leq 4.0 \tag{3}$$

$$1.4 \leq d_1^2/f^2(N_1-1) \leq 4.0 \tag{4}$$

wherein, f represents the focal length of the single lens element, $r_1$ represents the paraxial radius of curvature of the light source side surface of the single lens element, $N_1$ represents the refractive index of the single lens element and $d_1$ represents the axial thickness of the single lens element.

If the radius of curvature of the light source side surface ($r_1$) becomes small beyond the lower limit of the condition (2), the coma is generated, which is hard to be corrected. If the refractive power of the single lens element (L) becomes small beyond the lower limit of the condition (2), the absolute value of the radius of curvature of the light source side surface or the disk side surface of the lens element should be small in order to keep the predetermined focal length, but in either case the coma is generated, which is hard to be corrected. On the other hand, if the radius of curvature of the light source side surface ($r_1$) increases, considerable coma flare is generated near the pupil of the single lens element. This coma flare can be corrected by forming the lens element of a glass with high refractive power, but the refractive power of the lens element becomes great beyond the upper limit of the condition (2), resulting in generation of the astigmatism and failure to keep the optical performance in off-axial region well.

If the axial thickness ($d_1$) or the radius of curvature ($r_1$) of the light source side surface of the single lens element (L) becomes small beyond the lower limit of the condition (3), the absolute value of the radius of curvature of the disk side surface ($r_2$) should be made greater in order to keep the predetermined focal length so that the astigmatism becomes difficult to be corrected. In contrast thereto, if the axial thickness ($d_1$) or the radius of curvature ($r_1$) of the light source side surface of the single lens element (L) becomes great beyond the upper limit of the condition (3), the absolute value of the radius of curvature of the disk side surface ($r_2$) should be made small, so that even with the effect of the aspherical surface the coma is generated, which is difficult to be corrected.

If the axial thickness ($d_1$) becomes small or the positive refractive power of the single lens element (L) becomes great beyond the lower limit of the condition (4), the absolute value of the radius of curvature of the light source side surface ($r_1$) or the disk side surface ($r_2$) should be made great. If, here, the absolute value of the radius of curvature of the disk side surface ($r_2$) becomes great, the astigmatism becomes difficult to be corrected, and if that of the light source side surface ($r_1$) becomes great, the coma flare is generated, which is difficult to be corrected even with the effect of the aspherical surface. On the other hand, if the axial thickness ($d_1$) becomes great or the positive refractive power becomes small beyond the upper limit of the condition (4), the absolute value of the radius of curvature of either side surface should be made small, so that the coma is generated, which cannot be corrected well even with the effect of the aspherical surface.

It is desired that the disk side surface is aspherical for better correction of the comma.

Additionally the following condition is effective in combination with the conditions (2), (3), (4) in order to correct the coma much btter:

$$0 \leq f(N_1^2 - N_1 - 1)/|r_2| \leq 1.2 \quad (5)$$

wherein, $r_2$ represents the radius of curvature of the disk side surface of the single lens.

If the refractive power of the single lens element (L) becomes small beyond the lower limit of the condition (5), the absolute value of the radius of curvature of the light source side surface ($r_1$) or the disk side surface ($r_2$) should be small, so that the coma cannot be corrected well. Furthermore, in case the disk side surface is aspherical, the absolute value of radius ($r_2$) of this surface becomes small, causing the radius of curvature of the disk side surface ($r_2$) assume a small value so that the distance from the aspherical surface to the imaging plane tangent to the top point of the aspherical surface becomes great, much precision is needed to manufacture a cast and to form the aspherical surface by molding. On the other hand, if the absolute value of the radius of curvature of the disk side surface ($r_2$) becomes small beyond the upper limit of the condition (5), the coma becomes hard to be corrected.

According to the present invention, the following conditions are effective instead of the above conditions, (2), (3), and (4):

$$1.4 \leq (N_1 - 1)r_1/f \leq 3.9 \quad (6)$$

$$1.6 \leq d_1 r_1/f^2 \leq 4.0 \quad (7)$$

wherein, f represents the focal length of the single lens element, $r_1$ represents the paraxial radius of curvature of the light source side surface of the single lens element, $N_1$ represents the refractive index of the single lens element, and $d_1$ represents the axial thickness of the single lens element.

This example of the invention is shown in FIGS. 1 and 2.

In the case where the light source side surface is aspherical and the disk side surface is spherical, it is desired to form the single lens element of a glass with a higher refractive power in order to correct the coma better. To this end it is desired to fulfill conditions (6) and (7). These conditions have the same meanings respectively as the conditions (2) and (3) and if the lower and upper limits are violated, the same aberrations as in the case of violations of the conditions (2) and (3) are generated.

Additionally, the following condition is effective in combination with the conditions (6) and (7) in order to correct the coma much better:

$$0 \leq f(N_1^2 - N_1 - 1)/|r_2| \leq 1.2 \quad (8)$$

wherein, $r_2$ represents the radius of curvature of the disk side surface of the single lens element.

This condition is the same as condition (5) and if the lower and upper limits are violated, the same aberrations are generated.

Furthermore, according to the present invention, the following conditions are effective instead of the above conditions (1), (2), (3) and (4):

$$0.9 \leq (N_1 - 1)r_1/f \leq 3.9 \quad (9)$$

$$1.2 \leq d_1 r_1/f^2 \leq 4.0 \quad (10)$$

$$0.7 \leq r_1(N_1 - 1)(1 + |\beta|)/-r_2 \leq 3.0 \quad (11)$$

wherein, f represents the focal length of the single lens element, $r_1$ represents the paraxial radius of curvature of the light source side surface of the single lens element, $N_1$ represents the refractive index of the single lens element, $d_1$ represents the axial thickness of the single lens element, $r_2$ represents the radius of curvature of the disk side surface of the single lens element and $\beta$ represents the magnification of the single lens element.

Figure 3:
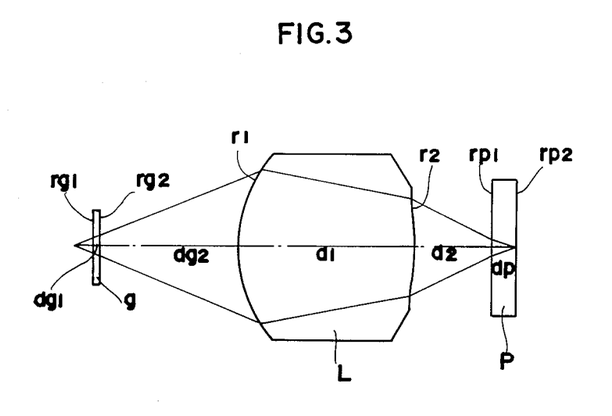
FIG. 3 is a cross sectional view of the objective lens system according to embodiments 14, 15, 16 of the present invention.
Figure 4:
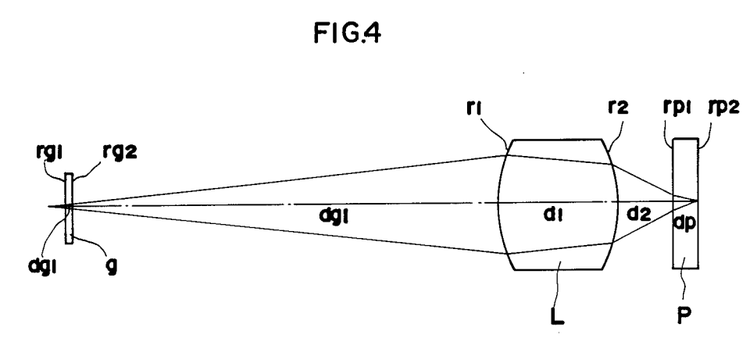
FIG. 4 is a cross sectional view of the objective lens system according to embodiment 17 of the present invention.
Figure 5:
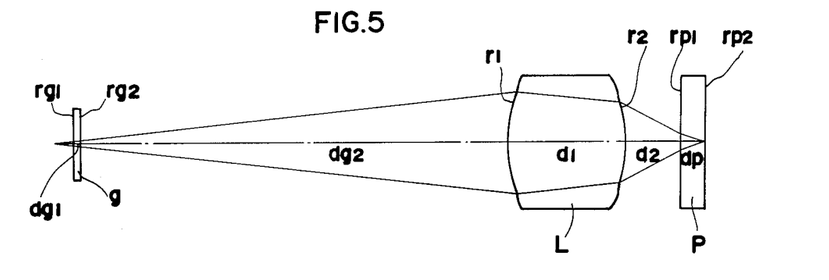
FIG. 5 is a cross sectional view of the objective lens system according to embodiment 18 of the present invention.

This example of the invention is shown in FIGS. 3, 4 and 5.

The conditions (9) and (10) have the same meanings respectively as conditions (2) and (3) and the same aberrations as in the case of violation of the conditions (2) and (3) are generated if the upper or lower limits are violated.

Condition (11) shows the relation between the shape of the single lens element (L) and the magnification. If the magnification becomes greater beyond the upper limit of the condition (11), aberrations in the off-axial region, especially the coma become difficult to be corrected. And if the absolute value of the radius of curvature of the light source side surface ($r_1$) becomes greater as compared with that of the disk side surface ($r_2$) beyond the upper limit of condition (11), aberrations in the off-axial region, especially coma cannot be corrected well. On the other hand, if the absolute value of the radius of curvature of the light source side surface ($r_1$) becomes smaller as compared with that of the disk side surface ($r_2$) beyond the lower limit of condition (11), coma flare is generated at the marginal ray, and it cannot be corrected well.

The disk side surface is desired to be aspherical so that the coma may be corrected well.

It is desired that conditions (9) and (10) have the following ranges respectively in order to correct abberations better.

$$1.4 \leq (N_1-1)r_1/f \leq 3.9 \quad (12)$$

$$1.6 \leq d_1 r_1/f_2 \leq 4.0 \quad (13)$$

According to the present invention the following conditions are effective instead of the above conditions (2), (3) and (4):

$$0.9 < (N_1-1)r_1/f < 3.9 \quad (14)$$

$$0.6 < r_1/ < r_2 \cdot (N_1-1) < 1.7 \quad (15)$$

$$0.5 < \epsilon < 1.5 \quad (16)$$

wherein, f represents the focal length of the single lens element, $r_1$ represents the paraxial radius of curvature of the light source side surface of the single lens element, $N_1$ represents the refractive index of the single lens element, $r_2$ represents the radius of curvature of the disk side surface of the single lens element, and $\epsilon$ represents the conic constant.

This example of the invention is shown in FIGS. 1 and 2.

Condition (14) is the same as condition (2) and has the same meaning.

Condition (15) is the condition for correcting aberrations in the off-axial region. If the refractive power of the single lens element at the predetermined focal length becomes greater than the upper limit of the condition (15), the absolute value of the radius of curvature of the disk side surface ($r_2$) is increased, so that the astigmatism is generated. If the ratio of the radius of curvature of the light source side surface ($r_1$) to that of the disk side surface ($r_2$) becomes greater than the upper limit of condition (15), the absolute value of the radius of curvature of the disk side surface ($r_2$) becomes excessively small, so that the coma is generated, which cannot be corrected well. On the other hand, if the refractive power of the single lens element becomes smaller than the lower limit of condition (15), the absolute value of the radius of curvature of the disk side surface is decreased, so that the coma is generated. And if the ratio of the radius of curvature of the light source side surface ($r_1$) to that of the disk side surface ($r_2$) decreases beyond the lower limit of condition (15), the absolute value of the radius of curvature of the disk side surface ($r_2$) becomes excessively great, so that the astigmatism is generated and a satisfactorily good optical performance at the desired image height cannot be obtained.

Condition (16) is the condition for correcting aberrations in off-axial region. If the conic constant becomes great beyond the upper limit of condition (16), spherical aberration undergoes under-correction especially at the marginal ray. On the other hand, if the conic constant becomes small over the lower limit of condition (16), spherical aberration undergoes over-correction, which is difficult to be corrected.

The aspherical surface of the single lens element (L) can be provided by forming an aspherical layer of grease on the spherical glass.

The following tables 1 to 18 disclose, respectively, design parameters of the first through 18th embodiments of the present invention. In the tables, f equals the focal length of the whole lens system, $rg_1$ and $rg_2$ is the radius of curvature of the light source side and disk side surface of the cover glass (G) of the semiconductor laser, $r_1$ and $r_2$ are the radii of curvature respectively of the light source side surface and the disk side surface, $rp_1$ and $rp_2$ are the radius of curvature of the light source side and disk side surface of the cover glass (P) of the disk, $dg_1$, $dg_2$, ($d_0$), $d_1$, $d_2$ and dp represent the axial distance including both air spaces and the actual thickness of the lens element, cover glass of the semiconductor and the disk and finally Ng, $N_1$, and Np represent respectively the refractive index of the cover glass of the semiconductor (G), the single lens element (L), and the cover glass of the disk (P) at the wavelength $\lambda = 800$ nm. The asterisk (*) represents the aspherical surface defined as follows, and values for coefficients appearing in the formula are shown at the bottom of respective tables:

$$x = \frac{Coh^2}{1 + \sqrt{1 - \epsilon Coh^2}} + \Sigma c_i h^{2i} \quad (i = 1,2,3, \ldots m)$$

wherein, x represents the coordinate along the optical axis measured from an imaginary plane tangent to the aspherical surface perpendicularly to the optical axis, h represents the coordinate perpendicular to the optical axis measured from the optical axis, Co represents paraxial curvature ($1/r_1$) of the light source side surface of the lens (L), $\epsilon$ represents the conic constant and $c_i$ represent the aspherical surface coefficients. Furthermore, NA represents the numerical aperture of the objective lens system, and $\beta$ represents the magnification.

Among the following embodiments, it should be noted that the paraxial curvature ($Co = 1/r_1$) of the aspherical surface is zero in the first to third embodiments. This is favorable to a test or measurement of the formed shape of the aspherical surface in manufacturing, since the paraxial curvature can be left out of consideration.

TABLE 1

| [Embodiment 1] NA = 0.47  f = 1.0  $\beta$ = −0.17 |||||
|---|---|---|---|---|
| radius of curvature || axial distance || refractive index |
| $rg_1$ | ∞ | | | |
| | | $dg_1$ | 0.067 | Ng 1.49000 |
| $rg_2$ | ∞ | | | |
| | | $dg_2$ | 6.643 | |
| $r_1$* | 1.2686 | | | |
| | | $d_1$ | 1.356 | $N_1$ 2.10000 |
| $r_2$* | −3.6447 | | | |
| | | $d_2$ | 0.440 | |
| $rp_1$ | ∞ | | | |
| | | dp | 0.267 | Np 1.57147 |
| $rp_2$ | ∞ | | | |
| aspherical surface coefficients |||||
| $r_1$* $\epsilon$ = 1.0 |||||
| $C_1$ = 0.0 | $C_2$ = −0.62371 × $10^{-1}$ || $C_3$ = −0.35855 × $10^{-1}$ ||
| | $C_4$ = −0.34573 × $10^{-1}$ || $C_5$ = −0.10152 × $10^{-2}$ ||
| $r_2$* $\epsilon$ = 1.0 |||||
| $C_1$ = 0.0 | $C_2$ = 0.94476 × $10^{-1}$ || $C_3$ = −0.31391 ||
| | $C_4$ = −0.34388 × $10^{-4}$ || $C_5$ = 0.26302 × $10^{-4}$ ||
| ($N_1$ − 1)$r_1$/f = 1.47 |||||
| $d_1 r_1/f^2$ = 1.73 |||||

TABLE 1-continued

[Embodiment 1]
NA = 0.47   f = 1.0   β = −0.17

$d_1{}^2/f^2(N_1 - 1) = 1.68$
$f(N_1{}^2 - N_1 - 1)/|r_2| = 0.36$
$r_1(N_1 - 1)(1 + |\beta|)/-r_2 = 0.45$
$\dfrac{r_1}{-r_2} \cdot (N_1 - 1) = 1.0$ $\epsilon = 0.38$

TABLE 2

[Embodiment 2]
NA = 0.47   f = 1.0   β = −0.17

| radius of curvature | axial distance | refractive index |
|---|---|---|
| $r_{g1}$  ∞ | | |
| | $d_{g1}$  0.067 | $N_g$  1.49000 |
| $r_{g2}$  ∞ | | |
| | $d_{g2}$  6.450 | |
| $r_a{}^*$  1.6576 | | |
| | $d_0$  0.007 | $N_0$  1.51539 |
| $r_1$  1.6576 | | |
| | $d_1$  1.422 | $N_1$  2.14000 |
| $r_2$  −1.9751 | | |
| | $d_2$  0.540 | |
| $r_{p1}$  ∞ | | |
| | $d_p$  0.267 | $N_p$  1.57147 |
| $r_{p2}$  ∞ | | | aspherical surface coefficients

$r_a{}^*$  $\epsilon = 1.0$
$C_1 = 0.0$   $C_2 = -0.20762$   $C_3 = -0.13173$
$C_4 = -0.64485 \times 10^{-1}$   $C_5 = -0.36803 \times 10^{-2}$ $(N_1 - 1)r_1/f = 1.89$
$d_1 r_1/f^2 = 2.36$
$d_1{}^2/f^2(N_1 - 1) = 1.77$
$f(N_1{}^2 - N_1 - 1)/|r_2| = 0.73$
$r_1(N_1 - 1)(1 + |\beta|)/-r_2 = 1.12$
$\dfrac{r_1}{-r_2} \cdot (N_1 - 1) = 1.0$ $\epsilon = 0.96$

TABLE 3

[Embodiment 3]
NA = 0.47   f = 1.0   β = −0.17

| radius of curvature | axial distance | refractive index |
|---|---|---|
| $r_{g1}$  ∞ | | |
| | $d_{g1}$  0.067 | $N_g$  1.49000 |
| $r_{g2}$  ∞ | | |
| | $d_{g2}$  6.454 | |
| $r_1{}^*$  1.6617 | | |
| | $d_1$  1.422 | $N_1$  2.14000 |
| $r_2$  −1.9756 | | |
| | $d_2$  0.542 | |
| $r_{p1}$  ∞ | | |
| | $d_p$  0.267 | $N_p$  1.57147 |
| $r_{p2}$  ∞ | | | aspherical surface coefficients

$r_1{}^*$  $\epsilon = 1.0$
$C_1 = 0.0$   $C_2 = -0.96367 \times 10^{-1}$   $C_3 = -0.48541 \times 10^{-1}$
$C_4 = -0.57170 \times 10^{-1}$   $C_5 = -0.34961 \times 10^{-2}$ $(N_1 - 1)r_1/f = 1.89$
$d_1 r_1/f^2 = 2.36$
$d_1{}^2/f^2(N_1 - 1) = 1.77$
$f(N_1{}^2 - N_1 - 1)/|r_2| = 0.73$
$r_1(N_1 - 1)(1 + |\beta|)/-r_2 = 1.12$
$\dfrac{r_1}{-r_2} \cdot (N_1 - 1) = 1.0$ $\epsilon = 0.96$

TABLE 4

[Embodiment 4]
NA = 0.47   f = 1.0   β = −0.17

| radius of curvature | axial distance | refractive index |
|---|---|---|
| $r_{g1}$  ∞ | | |
| | $d_{g1}$  0.067 | $N_g$  1.49000 |
| $r_{g2}$  ∞ | | |
| | $d_{g2}$  6.502 | |
| $r_1{}^*$  1.7487 | | |
| | $d_1$  1.700 | $N_1$  2.39000 |
| $r_2$  −2.9453 | | |
| | $d_2$  0.435 | |
| $r_{p1}$  ∞ | | |
| | $d_p$  0.267 | $N_p$  1.57147 |
| $r_{p2}$  ∞ | | | aspherical surface coefficients

$r_1{}^*$  $\epsilon = 1.0$
$C_1 = 0.0$   $C_2 = -0.51488 \times 10^{-1}$   $C_3 = -0.26625 \times 10^{-1}$
$C_4 = -0.11890 \times 10^{-1}$   $C_5 = 0.69239 \times 10^{-3}$ $(N_1 - 1)r_1/f = 2.43$
$d_1 r_1/f^2 = 2.97$
$d_1{}^2/f^2(N_1 - 1) = 2.08$
$f(N_1{}^2 - N_1 - 1)/|r_2| = 0.79$
$r_1(N_1 - 1)(1 + |\beta|)/-r_2 = 0.97$
$\dfrac{r_1}{-r_2} \cdot (N_1 - 1) = 1.0$ $\epsilon = 0.83$

TABLE 5

[Embodiment 5]
NA = 0.47   f = 1.0   β = −0.22

| radius of curvature | axial distance | refractive index |
|---|---|---|
| $r_{g1}$  ∞ | | |
| | $d_{g1}$  0.067 | $N_g$  1.49000 |
| $r_{g2}$  ∞ | | |
| | $d_{g2}$  5.271 | |
| $r_1{}^*$  1.2502 | | |
| | $d_1$  1.333 | $N_1$  2.05000 |
| $r_2$  −2.9756 | | |
| | $d_2$  0.504 | |
| $r_{p1}$  ∞ | | |
| | $d_p$  0.267 | $N_p$  1.57147 |
| $r_{p2}$  ∞ | | | aspherical surface coefficients

$r_1{}^*$  $\epsilon = 1.0$
$C_1 = 0.0$   $C_2 = -0.71690 \times 10^{-1}$   $C_3 = -0.29855 \times 10^{-1}$
$C_4 = -0.50256 \times 10^{-1}$   $C_5 = -0.16435 \times 10^{-2}$ $r_2{}^*$  $\epsilon = 1.0$
$C_1 = 0.0$   $C_2 = 0.13636$   $C_3 = -0.32847$
$C_4 = 0.57220 \times 10^{-3}$   $C_5 = 0.36914 \times 10^{-4}$ $(N_1 - 1)r_1/f = 1.31$
$d_1 r_1/f^2 = 1.66$
$d_1{}^2/f^2(N_1 - 1) = 1.68$
$f(N_1{}^2 - N_1 - 1)/|r_1{}^2| = 0.39$
$r_1(N_1 - 1)(1 + |\beta|)/-r_2 = 0.54$
$\dfrac{r_1}{-r_2} \cdot (N_1 - 1) = 1.0$ $\epsilon = 0.44$

TABLE 6

[Embodiment 6]
NA = 0.47   f = 1.0   β = −0.22

| radius curvature | axial distance | refractive index |
|---|---|---|
| $r_{g1}$  ∞ | | |
| | $d_{g1}$  0.067 | $N_g$  1.49000 |
| $r_{g2}$  ∞ | | |
| | $d_{g2}$  5.293 | |
| $r_a{}^*$  1.2169 | | |
| | $d_0$  0.007 | $N_0$  1.51539 |
| $r_1$  1.2169 | | |
| | $d_1$  1.333 | $N_1$  2.05000 |

TABLE 6-continued

[Embodiment 6]
NA = 0.47  f = 1.0  β = −0.22

| | | |
|---|---|---|
| $r_2^*$ | −3.3292 | |
| | $d_2$ 0.487 | |
| $r_{p1}$ | ∞ | |
| | $d_p$ 0.267 | $N_p$ 1.57147 |
| $r_{p2}$ | ∞ | | aspherical surface coefficients $r_a^*$ $\epsilon = 1.0$
$C_1 = 0.0$   $C_2 = -0.14089$   $C_3 = -0.57431 \times 10^{-1}$
$C_4 = -0.56260 \times 10^{-1}$   $C_5 = -0.18309 \times 10^{-2}$ $r_2^*$ $\epsilon = 1.0$
$C_1 = 0.0$   $C_2 = 0.14537$   $C_3 = -0.31199$
$C_4 = 0.95588 \times 10^{-3}$   $C_5 = 0.40854 \times 10^{-4}$ $(N_1 - 1)r_1/f = 1.25$
$d_1 r_1/f^2 = 1.62$
$d_1^2/f^2(N_1 - 1) = 1.68$
$f(N_1^2 - N_1 - 1)/|r_2| = 0.35$
$r_1(N_1 - 1)(1 + |\beta|)/-r_2 = 0.47$
$\dfrac{r_1}{-r_2} \cdot (N_1 - 1) = 1.0$
$\epsilon = 0.38$

TABLE 7

[Embodiment 7]
NA = 0.47  f = 1.0  β = −0.38

| radius of curvature | axial distance | refractive index |
|---|---|---|
| $r_{g1}$  ∞ | | |
| | $d_{g1}$ 0.067 | $N_g$ 1.49000 |
| $r_{g2}$  ∞ | | |
| | $d_{g2}$ 3.262 | |
| $r_1^*$  1.2610 | | |
| | $d_1$ 1.289 | $N_1$ 1.95000 |
| $r_2^*$  −1.9338 | | |
| | $d_2$ 0.712 | |
| $r_{p1}$  ∞ | | |
| | $d_p$ 0.267 | $N_p$ 1.57147 |
| $r_{p2}$  ∞ | | | aspherical surface coefficients $r_1^*$ $\epsilon = 1.0$
$C_1 = 0.0$   $C_2 = -0.10852$   $C_3 = -0.16503 \times 10^{-1}$
$C_4 = -0.58946 \times 10^{-1}$   $C_5 = -0.35616 \times 10^{-2}$ $r_2^*$ $\epsilon = 1.0$
$C_1 = 0.0$   $C_2 = 0.15569$   $C_3 = -0.18428$
$C_4 = 0.19846 \times 10^{-1}$   $C_5 = 0.56733 \times 10^{-3}$ $(N_1 - 1)r_1/f = 1.20$
$d_1 r_1/f^2 = 1.63$
$d_1^2/f^2(N_1 - 1) = 1.75$
$f(N_1^2 - N_1 - 1)/|r_2| = 0.44$
$r_1(N_1 - 1)(1 + |\beta|)/-r_2 = 0.85$
$\dfrac{r_1}{-r_2} \cdot (N_1 - 1) = 1.0$
$\epsilon = 0.62$

TABLE 8

[Embodiment 8]
NA = 0.47  f = 1.0  β = −0.45

| radius of curvature | axial distance | refractive index |
|---|---|---|
| $r_{g1}$  ∞ | | |
| | $d_{g1}$ 0.067 | $N_g$ 1.49000 |
| $r_{g2}$  ∞ | | |
| | $d_{g2}$ 2.798 | |
| $r_1^*$  1.2955 | | |
| | $d_1$ 1.267 | $N_1$ 1.90000 |
| $r_2^*$  −1.5827 | | |
| | $d_2$ 0.817 | |
| $r_{p1}$  ∞ | | |
| | $d_p$ 0.267 | $N_p$ 1.57147 |
| $r_{p2}$  ∞ | | | aspherical surface coefficients $r_1^*$ $\epsilon = 1.0$
$C_1 = 0.0$   $C_2 = -0.13844$   $C_3 = -0.12271 \times 10^{-1}$

TABLE 8-continued

[Embodiment 8]
NA = 0.47  f = 1.0  β = −0.45

$C_4 = -0.83257 \times 10^{-1}$   $C_5 = -0.58614 \times 10^{-2}$ $r_2^*$ $\epsilon = 1.0$
$C_1 = 0.0$   $C_2 = 0.15549$   $C_3 = -0.17051$
$C_4 = 0.49442 \times 10^{-1}$   $C_5 = 0.16965 \times 10^{-2}$ $(N_1 - 1)r_1/f = 1.17$
$d_1 r_1/f^2 = 1.65$
$d_1^2/f^2(N_1 - 1) = 1.79$
$f(N_1^2 - N_1 - 1)/|r_2| = 0.45$
$r_1(N_1 - 1)(1 + |\beta|)/-r_2 = 1.07$
$\dfrac{r_1}{-r_2} \cdot (N_1 - 1) = 1.0$
$\epsilon = 0.74$

TABLE 9

[Embodiment 9]
NA = 0.49  f = 1  β = −0.17

| radius of curvature | axial distance | refractive index |
|---|---|---|
| $r_{g1}$  ∞ | | |
| | $d_{g1}$ 0.125 | $N_g$ 1.49000 |
| $r_{g2}$  ∞ | | |
| | $d_{g2}$ 6.474 | |
| $r_1^*$  1.6060 | | |
| | $d_1$ 1.333 | $N_1$ 2.14000 |
| $r_2$  −2.1913 | | |
| | $d_2$ 0.408 | |
| $r_{p1}$  ∞ | | |
| | $d_p$ 0.500 | $N_p$ 1.57147 |
| $r_{p2}$  ∞ | | | aspherical surface coefficients $r_1^* = 1.0$
$C_1 = 0.0$   $C_2 = -0.871129 \times 10^{-1}$   $C_3 = -0.316098 \times 10^{-1}$
$C_4 = -0.571065 \times 10^{-1}$   $C_5 = -0.349594 \times 10^{-2}$ $(N_1 - 1)r_1/f = 1.83$
$d_1 r_1/f^2 = 2.14$
$d_1^2/f^2(N_1 - 1) = 1.55$
$f(N_1^2 - N_1 - 1)/|r_2| = 0.66$
$r_1(N_1 - 1)(1 + |\beta|)/-r_2 = 0.98$
$\dfrac{r_1}{-r_2} \cdot (N_1 - 1) = 1.0$
$\epsilon = 0.84$

TABLE 10

[Embodiment 10]
NA = 0.47  f = 1  β = −0.17

| radius of curvature | axial distance | refractive index |
|---|---|---|
| $r_{g1}$  ∞ | | |
| | $d_{g1}$ 0.083 | $N_g$ 1.49000 |
| $r_{g2}$  ∞ | | |
| | $d_{g2}$ 6.537 | |
| $r_1^*$  1.4224 | | |
| | $d_1$ 1.278 | $N_1$ 2.06500 |
| $r_2$  −2.2750 | | |
| | $d_2$ 0.494 | |
| $r_{p1}$  ∞ | | |
| | $d_p$ 0.333 | $N_p$ 1.57147 |
| $r_{p2}$  ∞ | | | aspherical surface coefficients $r_1^* = 1.0$
$C_1 = 0.0$   $C_2 = -0.906604 \times 10^{-1}$   $C_3 = -0.633411 \times 10^{-1}$
$C_4 = -0.149674 \times 10^{-1}$   $C_5 = -0.177734 \times 10^{-3}$ $(N_1 - 1)r_1/f = 1.51$
$d_1 r_1/f^2 = 1.82$
$d_1^2/f^2(N_1 - 1) = 1.54$
$f(N_1^2 - N_1 - 1)/|r_2| = 0.53$
$r_1(N_1 - 1)(1 + |\beta|)/-r_2 = 0.78$
$\dfrac{r_1}{-r_2} \cdot (N_1 - 1) = 0.67$
$\epsilon = 1.0$

TABLE 11

[Embodiment 11]
NA = 0.47  f = 1.0  β = −0.22

| radius of curvature | | axial distance | | refractive index |
|---|---|---|---|---|
| $rg_1$ | ∞ | | | |
| | | $dg_1$ 0.067 | $Ng$ | 1.49000 |
| $rg_2$ | ∞ | | | |
| | | $dg_2$ 4.752 | | |
| $r_1$* | 1.4015 | | | |
| | | $d_1$ 1.911 | $N_1$ | 2.06500 |
| $r_2$* | −1.3162 | | | |
| | | $d_2$ 0.347 | | |
| $rp_1$ | ∞ | | | |
| | | $dp$ 0.267 | $Np$ | 1.57147 |
| $rp_2$ | ∞ | | | | aspherical surface coefficients

$r_1$*  $\epsilon = 1.0$
$C_1 = 0.0$   $C_2 = -0.702213 \times 10^{-1}$   $C_3 = -0.397707 \times 10^{-1}$
              $C_4 = -0.256511 \times 10^{-1}$   $C_5 = -0.810222 \times 10^{-2}$ $r_2$*  $\epsilon = 1.0$
$C_1 = 0.0$   $C_2 = 0.571793$   $C_3 = -1.278405$
              $C_4 = 0.286478 \times 10^{-2}$   $C_5 = 0.974928 \times 10^{-4}$ $(N_1 - 1)r_1/f = 1.49$
$d_1 r_1/f^2 = 2.68$
$d_1^2/f^2(N_1 - 1) = 3.43$
$f(N_1^2 - N_1 - 1)/|r_2| = 0.91$
$r_1(N_1 - 1)(1 + |\beta|)/-r_2 = 1.13$
$\frac{r_1}{-r_2} \cdot (N_1 - 1) = 1.38$
$\epsilon = 1.0$

TABLE 12

[Embodiment 12]
Na = 0.45  f = 1.0  β = −0.17

| radius of curvature | | axial distance | | refractive index |
|---|---|---|---|---|
| $rg_1$ | ∞ | | | |
| | | $dg_1$ 0.094 | $Ng$ | 1.49000 |
| $rg_2$ | ∞ | | | |
| | | $dg_2$ 6.340 | | |
| $r_1$* | 2.2222 | | | |
| | | $d_1$ 1.700 | $N_1$ | 2.39000 |
| $r_2$ | −2.0603 | | | |
| | | $d_2$ 0.487 | | |
| $rp_1$ | ∞ | | | |
| | | $dp$ 0.375 | $Np$ | 1.57222 |
| $rp_2$ | ∞ | | | | aspherical surface coefficients

$r_1$*  $\epsilon = 1.0$
$C_1 = 0.0$   $C_2 = -0.759242 \times 10^{-1}$   $C_3 = -0.484883 \times 10^{-1}$
              $C_4 = -0.330197 \times 10^{-1}$   $C_5 = -0.443189 \times 10^{-2}$ $(N_1 - 1)r_1/f = 3.09$
$d_1 r_1/f^2 = 3.78$
$d_1^2/f^2(N_1 - 1) = 2.08$
$f(N_1^2 - N_1 - 1)/|r_2| = 1.13$
$r_1(N_1 - 1)(1 + |\beta|)/-r_2 = 1.76$
$\frac{r_1}{-r_2} \cdot (N_1 - 1) = 1.50$
$\epsilon = 1.0$

TABLE 13

[Embodiment 13]
NA = 0.45  f = 1.0  β = −0.20

| radius of curvature | | axial distance | | refractive index |
|---|---|---|---|---|
| $rg_1$ | ∞ | | | |
| | | $dg_1$ 0.077 | $Ng$ | 1.49000 |
| $rg_2$ | ∞ | | | |
| | | $dg_2$ 5.615 | | |
| $ra$* | 1.1758 | | | |
| | | $do$ 0.008 | $No$ | 1.51509 |
| $r_1$ | 1.3811 | | | |
| | | $d_1$ 1.031 | $N_1$ | 1.79215 |
| $r_2$ | −1.3811 | | | |
| | | $d_1$ 0.636 | | |
| $rp_1$ | ∞ | | | |
| | | $dp$ 0.306 | $Np$ | 1.57222 |
| $rp_2$ | ∞ | | | | aspherical surface coefficients

$r_1$*  $\epsilon = 0.55$
$C_1 = 0.0$   $C_2 = -0.292694$   $C_3 = -0.228172$
              $C_4 = -0.223349$   $C_5 = -0.351381 \times 10^{-2}$ $(N_1 - 1)r_1/f = 0.93$
$d_1 r_1/f^2 = 1.22$
$d_1^2/f^2(N_1 - 1) = 1.36$
$f(N_1^2 - N_1 - 1)/|r_2| = 0.30$
$r_1(N_1 - 1)(1 + |\beta|)/-r_2 = 0.81$
$\frac{r_1}{-r_2} \cdot (N_1 - 1) = 0.67$
$\epsilon = 0.55$

TABLE 14

[Embodiment 14]
NA = 0.45  f = 1.0  β = −0.84

| radius of curvature | | axial distance | | refractive index |
|---|---|---|---|---|
| $rg_1$ | ∞ | | | |
| | | $dg_1$ 0.066 | $Ng$ | 1.49000 |
| $rg_2$ | ∞ | | | |
| | | $dg_2$ 1.672 | | |
| $r_1$* | 1.1384 | | | |
| | | $d_1$ 1.890 | $N_1$ | 2.05000 |
| $r_2$* | −2.0223 | | | |
| | | $d_2$ 0.819 | | |
| $rp_1$ | ∞ | | | |
| | | $dp$ 0.264 | $Np$ | 1.57147 |
| $rp_2$ | ∞ | | | | aspherical surface coefficients

$r_1$*  $\epsilon = 1.0$
$C_1 = 0.0$   $C_2 = -0.144466$   $C_3 = 0.412891 \times 10^{-1}$
              $C_4 = -0.339208 \times 10^{-1}$   $C_5 = -0.236439 \times 10^{-1}$ $r_2$*  $\epsilon = 1.0$
$C_1 = 0.0$   $C_2 = 0.327563$   $C_3 = 0.575198 \times 10^{-1}$
              $C_4 = 0.956025 \times 10^{-1}$   $C_5 = 0.328127 \times 10^{-2}$ $(N_1 - 1)r_1/f = 1.20$
$d_1 r_1/f^2 = 2.15$
$d_1^2/f^2(N_1 - 1) = 3.40$
$f(N_1^2 - N_1 - 1)/|r_2| = 0.57$
$r_1(N_1 - 1)(1 + |\beta|)/-r_2 = 1.09$
$\frac{r_1}{-r_2} \cdot (N_1 - 1) = 0.59$
$\epsilon = 1.0$

TABLE 15

[Embodiment 15]
NA = 0.63  f = 1.0  β = −0.23

| radius of curvature | | axial distance | | refractive index |
|---|---|---|---|---|
| $rg_1$ | ∞ | | | |
| | | $dg_1$ 0.067 | $Ng$ | 1.49000 |
| $rg_2$ | ∞ | | | |
| | | $dg_2$ 4.757 | | |
| $r_1$* | 1.2866 | | | |
| | | $d_1$ 1.667 | $N_1$ | 2.00000 |
| $r_2$* | −1.5815 | | | |
| | | $d_2$ 0.414 | | |
| $rp_1$ | ∞ | | | |
| | | $dp$ 0.267 | $Np$ | 1.57147 |
| $rp_2$ | ∞ | | | | aspherical surface coefficients

$r_1$*  $\epsilon = 1.0$
$C_1 = 0.0$   $C_2 = -0.803740 \times 10^{-1}$   $C_3 = -0.418108 \times 10^{-1}$
              $C_4 = -0.584431 \times 10^{-2}$   $C_5 = -0.609765 \times 10^{-1}$ $r_2$*  $\epsilon = 1.0$
$C_1 = 0.0$   $C_2 = 0.380735$   $C_3 = -0.904315$

TABLE 15-continued

[Embodiment 15]
NA = 0.63   f = 1.0   β = −0.23

$C_4 = 0.909523$   $C_5 = 0.201477 \times 10^{-1}$ $(N_1 - 1)r_1/f = 1.29$
$d_1 r_1/f^2 = 2.14$
$d_1^2/f^2(N_1 - 1) = 2.78$
$f(N_1^2 - N_1 - 1)/|r_2| = 0.63$
$r_1(N_1 - 1)(1 + |\beta|)/-r_2 = 1.00$
$\dfrac{r_1}{-r_2} \cdot (N_1 - 1) = 0.81$
$\epsilon = 1.0$

TABLE 16

[Embodiment 16]
NA = 0.75   f = 1.0   β = −0.23

| radius of curvature | axial distance | refractive index |
|---|---|---|
| $r_{g1}$  ∞ | | |
| | $d_{g1}$  0.067 | $N_g$  1.49000 |
| $r_{g2}$  ∞ | | |
| | $d_{g2}$  4.503 | |
| $r_1^*$  1.4099 | | |
| | $d_1$  2.044 | $N_1$  2.15000 |
| $r_2^*$  −1.4000 | | |
| | $d_2$  0.286 | |
| $r_{p1}$  ∞ | | |
| | $d_p$  0.267 | $N_p$  1.57147 |
| $r_{p2}$  ∞ | | | aspherical surface coefficients $r_1^*$  $\epsilon = 1.0$
$C_1 = 0.0$   $C_2 = -0.611556 \times 10^{-1}$   $C_3 = -0.587792 \times 10^{-1}$
             $C_4 = 0.850492 \times 10^{-1}$   $C_5 = -0.1018804$
$r_2^*$  $\epsilon = 1.0$
$C_1 = 0.0$   $C_2 = 0.566623$   $C_3 = -1.17033$
             $C_4 = 1.02242$    $C_5 = 0.22239 \times 10^{-1}$ $(N_1 - 1)r_1/f = 1.62$
$d_1 r_1/f^2 = 2.88$
$d_1^2/f^2(N_1 - 1) = 3.63$
$f(N_1^2 - N_1 - 1)/|r_2| = 1.05$
$r_1(N_1 - 1)(1 + |\beta|)/-r_2 = 1.43$
$\dfrac{r_1}{-r_2} \cdot (N_1 - 1) = 1.16$
$\epsilon = 1.0$

TABLE 17

[Embodiment 17]
NA = 0.47   f = 1.0   β = −0.23

| radius of curvature | axial distance | refractive index |
|---|---|---|
| $r_{g1}$  ∞ | | |
| | $d_{g1}$  0.067 | $N_g$  1.49000 |
| $r_{g2}$  ∞ | | |
| | $d_{g2}$  4.806 | |
| $r_1^*$  1.1969 | | |
| | $d_1$  1.300 | $N_1$  1.78650 |
| $r_2^*$  −1.1969 | | |
| | $d_2$  0.583 | |
| $r_{p1}$  ∞ | | |
| | $d_p$  0.267 | $N_p$  1.57147 |
| $r_{p2}$  ∞ | | | aspherical surface coefficients $r_1^*$  $\epsilon = -5.0$
$C_1 = 0.0$   $C_2 = 0.276720$   $C_3 = -0.570105$
             $C_4 = 0.260641$   $C_5 = -0.582865 \times 10^{-1}$
$r_2^*$  $\epsilon = 0.4$
$C_1 = 0.0$   $C_2 = 0.288344$   $C_3 = -0.853167$
             $C_4 = 1.12124$    $C_5 = 0.272954 \times 10^{-1}$ $(N_1 - 1)r_1/f = 0.94$
$d_1 r_1/f^2 = 1.56$
$d_1^2/f^2(N_1 - 1) = 2.15$
$f(N_1^2 - N_1 - 1)/|r_2| = 0.34$
$r_1(N_1 - 1)(1 + |\beta|)/-r_2 = 0.97$

TABLE 17-continued

[Embodiment 17]
NA = 0.47   f = 1.0   β = −0.23

$\dfrac{r_1}{-r_2} \cdot (N_1 - 1) = 0.79$
$\epsilon = -5.0$

TABLE 18

[Embodiment 18]
NA = 0.47   f = 1.0   β = −0.23

| radius of curvature | axial distance | refractive index |
|---|---|---|
| $r_{g1}$  ∞ | | |
| | $d_{g1}$  0.067 | $N_g$  1.49000 |
| $r_{g2}$  ∞ | | |
| | $d_{g2}$  4.806 | |
| $r_1^*$  1.1969 | | |
| | $d_1$  1.300 | $N_1$  1.78650 |
| $r_2^*$  −1.1969 | | |
| | $d_2$  0.583 | |
| $r_{p1}$  ∞ | | |
| | $d_p$  0.267 | $N_p$  1.57147 |
| $r_{p2}$  ∞ | | | aspherical surface coefficients $r_1^*$  $\epsilon = 3.0$
$C_1 = 0.0$   $C_2 = -0.292512$   $C_3 = -0.504495$
             $C_4 = 0.800770$    $C_5 = -3.24710$
$r_2^*$  $\epsilon = 4.0$
$C_1 = 0.0$   $C_2 = 0.522586$   $C_3 = -0.288872$
             $C_4 = 1.73011$    $C_5 = 1.82717$ $(N_1 - 1)r_1/f = 0.94$
$d_1 r_1/f^2 = 1.56$
$d_1^2/f^2(N_1 - 1) = 2.15$
$f(N_1^2 - N_1 - 1)/|r_2| = 0.34$
$r_1(N_1 - 1)(1 + |\beta|)/-r_2 = 0.97$
$\dfrac{r_1}{-r_2} \cdot (N_1 - 1) = 0.79$
$\epsilon = 3.0$

What is claimed is:

1. An objective lens system with a single lens element for use in a device for optically reading digital data on an optical disk, said single lens element including:
   a light source side aspherical surface having a positive refractive power; and
   a disk side surface having a positive refractive power; and wherein
   said objective lens system is used with the projecting magnification β, $-\frac{1}{2} < \beta < -\frac{1}{8}$ and the objective lens system fulfills the following conditions:

$0.9 \leq (N_1-1)r_1/f \leq 3.9$ $1.4 \leq d_1 r_1/f^2 \leq 4.0$ $1.4 \leq d_1^2/f^2(N_1-1) \leq 4.0$ wherein:
   f represents the focal length of the single lens element;
   $r_1$ represents the paraxial radius of curvature of the light source side surface of the single lens element;
   $N_1$ represents the refractive index of the single lens element; and
   $d_1$ represents the axial thickness of the single lens element.

2. An objective lens system as claimed in claim 1, wherein said disk side surface is an aspherical surface.

3. An objective lens system as claimed in claim 2, wherein the objective lens system further fulfills the following condition:

$$0 \leq f(N_1^2 - N_1 - 1)/|r_2| \leq 1.2$$

wherein:
  $r_2$ represents the radius of curvature of the disk side surface of the single lens element.

4. An objective lens system with a single lens element for use in a device for optically reading digital data on an optical disk;
  said single lens element including:
    a light source side aspherical surface having a positive refractive power; and
    a disk side surface having a positive refractive power; and wherein
    said objective lens system is used with the projecting magnification $\beta$, $-\frac{1}{2} < \beta < -\frac{1}{8}$ and the objective lens system fulfills the following conditions:

$$1.4 \leq (N_1 - 1)r_1/f \leq 3.9$$

$$1.6 \leq d_1 r_1/f^2 \leq 4.0$$

wherein:
  f represents the focal length of the single lens element;
  $r_1$ represents the paraxial radius of curvature of the light source side surface of the single lens element;
  $N_1$ represents the refractive index of the single lens element; and
  $d_1$ represents the axial thickness of the single lens element.

5. An objective lens system as claimed in claim 4, wherein the objective lens system further fulfills the following condition:

$$0 \leq f(N_1^2 - N_1 - 1)/|r_2| \leq 1.2$$

wherein:
  $r_2$ represents the radius of curvature of the disk side surface of the single lens element.

6. An objective lens system with a single lens element for use in a device for optically reading digital data on an optical disk, said single lens element including:
  a light source side aspherical surface having a positive refractive power; and
  a disk side surface having a positive refractive power; and wherein the objective lens system fulfills the following conditions:

$$0.9 \leq (N_1 - 1)r_1/f \leq 3.9$$

$$1.2 \leq d_1 r_1/f^2 \leq 4.0$$

$$0.7 \leq r_1(N_1 - 1)(1 + |\beta|)/-r_2 = 3.0$$

wherein:
  f represents the focal length of the single lens element;
  $r_1$ represents the paraxial radius of curvature of the light source side surface of the single lens element;
  $N_1$ represents the refractive index of the single lens element;
  $d_1$ represents the axial thickness of the single lens element;
  $r_2$ represents the radius of curvature of the disk side surface of the single lens component; and
  $\beta$ represents the magnification of the single lens element.

7. An objective lens system as claimed in claim 6, wherein said disk side surface is an aspherical surface.

8. An objective lens system as claimed in claim 6, herein the objective lens system further fulfills the following conditions:

$$1.4 \leq (N_1 - 1)r_1/f \leq 3.9$$

$$1.6 \leq d_1 r_1/f^2 \leq 4.0.$$

9. An objective lens system with a single lens element for use in a device for optically reading digital data on an optical disk, said single lens element including:
  a light source side aspherical surface having a positive refractive power; and
  a disk side surface having a positive refractive power; and wherein
  said objective lens system is used with the projecting magnification $\beta$, $-\frac{1}{2} < \beta < -\frac{1}{8}$ and wherein the objective lens system fulfills the following conditions:

$$0.9 < (N_1 - 1)r_1/f < 3.9$$

$$0.6 < r_1/-r_2 \cdot (N_1 - 1) < 1.7$$

$$0.5 < \epsilon < 1.5$$

wherein:
  f represents the focal length of the single lens element;
  $r_1$ represents the paraxial radius of curvature of the light source side surface of the single lens element;
  $N_1$ represents the refractive index of the single lens element;
  $r_2$ represents the radius of curvature of the disk side surface of the single lens element; and
  $\epsilon$ represents the conic constant.

10. An objective lens system with a single lens element for a device for optically reading digital data on an optical disk, comprising the following design parameters:

| NA = 0.47 | f = 1.0 | $\beta$ = −0.17 | |
|---|---|---|---|
| radius of curvature | | axial distance | refractive index |
| $rg_1$ | ∞ | | |
| | | $dg_1$ 0.067 | Ng 1.49000 |
| $rg_2$ | ∞ | | |
| | | $dg_2$ 6.643 | |
| $r_1$* | 1.2686 | | |
| | | $d_1$ 1.356 | $N_1$ 2.10000 |
| $r_2$* | −3.6447 | | |
| | | $d_2$ 0.440 | |
| $rp_1$ | ∞ | | |
| | | $d_p$ 0.267 | Np 1.57147 |
| $rp_2$ | ∞ | | |
| aspherical surface coefficients | | | |

$r_1$* $\epsilon$ = 1.0
$C_1$ = 0.0    $C_2$ = −0.62371 × $10^{-1}$    $C_3$ = −0.35855 × $10^{-1}$
              $C_4$ = −0.34573 × $10^{-1}$    $C_5$ = −0.10152 × $10^{-2}$ $r_2$* $\epsilon$ = 1.0
$C_1$ = 0.0    $C_2$ = 0.94476 × $10^{-1}$    $C_3$ = −0.31391
              $C_4$ = −0.34388 × $10^{-4}$   $C_5$ = 0.26302 × $10^{-4}$ wherein NA is the numerical aperture, f is the focal length, $\beta$ is the magnification, subletter g refers to a cover glass, subletter p refers to a plate glass, and the aspherical surface is defined as follows:

$$x = \frac{C_o h^2}{1 \times 1 - \sqrt{C_o h^2}} + \Sigma c_i h^{2i} \quad (i = 1,2,3,\ldots m)$$

wherein, x represents a coordinate along the optical axis measured from an imaginary plane tangent to the aspherical surface perpendicularly to an optical axis, h represents the coordinate perpendicular to the optical axis measured from the optical axis, $C_o$ represents paraxial curvature ($1/r_1$) of the light source side surface of the lens (L), $\epsilon$ represents the conic constant and $c_i$ represents the aspherical surface coefficients.

* * * * *